(12) United States Patent
Mizuta (10) Patent No.: US 8,050,818 B2
(45) Date of Patent: Nov. 1, 2011

(54) ROLL STIFFNESS CONTROL APPARATUS OF VEHICLE

(75) Inventor: Yuichi Mizuta, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1028 days.

(21) Appl. No.: 11/154,634

(22) Filed: Jun. 17, 2005

(65) Prior Publication Data

US 2006/0006615 A1    Jan. 12, 2006

(30) Foreign Application Priority Data

Jul. 7, 2004    (JP) ................. 2004-200339

(51) Int. Cl.
*G06F 7/00*    (2006.01)
(52) U.S. Cl. ............... 701/37; 701/38; 701/48; 701/65; 701/69; 701/70; 701/71; 701/72; 701/73; 701/74; 280/124.134; 280/124.125; 280/124.106; 280/5.51; 280/5.508; 280/5.515; 280/5.502; 280/5.507; 180/197
(58) Field of Classification Search ............ 701/70, 701/38, 48, 65, 71, 72, 73, 74, 79, 90; 280/124.134, 280/125.125, 124.106, 5.51, 5.508, 8.515, 280/5.502, 8.507
See application file for complete search history.

(56) References Cited

U.S. PATENT DOCUMENTS

| 5,251,136 | A  | * | 10/1993 | Fukuyama et al. | ............. 701/38 |
| 2002/0128760 | A1 |   | 9/2002 | Bodie et al. | |
| 2004/0006410 | A1 | * | 1/2004 | Lee | .................. 701/1 |

FOREIGN PATENT DOCUMENTS

| CN | 200510126868.7 | | 6/2006 |
| DE | 44 04 098 A1 | | 9/1994 |
| DE | 10002455 | * | 7/2001 |
| DE | 697 13 694 T2 | | 10/2002 |
| DE | 10 2006 052 698 A1 | | 5/2007 |
| EP | 0 453 771 A2 | | 10/1991 |
| EP | 0 556 055 A2 | | 8/1993 |
| JP | A-60-029317 | | 2/1985 |
| JP | B2-03-016282 | | 3/1991 |
| JP | A-04-081316 | | 3/1992 |
| JP | U-05-084508 | | 4/1993 |
| JP | A-05-124410 | | 5/1993 |
| JP | A-06-024230 | | 2/1994 |

(Continued)

OTHER PUBLICATIONS

The First Office Action issued in Chinese Patent Application No. 200780044285.7; issued May 26, 2010; with English-language translation.

(Continued)

*Primary Examiner* — Mark Hellner
*Assistant Examiner* — Redhwan Mawari
(74) *Attorney, Agent, or Firm* — Oliff & Berridge, PLC (57) ABSTRACT

A roll stiffness control apparatus of a vehicle, which includes a controller that estimates a remaining capacity of front wheels to generate a lateral force and a remaining capacity of rear wheels to generate a lateral force, and that sets a roll stiffness distribution ratio between the front wheels and the rear wheels so as to reduce a difference between the remaining capacity of the front wheels to generate a lateral force and the remaining capacity of the rear wheels to generate a lateral force.

21 Claims, 6 Drawing Sheets

FOREIGN PATENT DOCUMENTS

| | | | |
|---|---|---|---|
| JP | 06-211018 | * | 8/1994 |
| JP | A 06-211018 | | 8/1994 |
| JP | A 07-17134 | | 3/1995 |
| JP | B2-2575491 | | 1/1997 |
| JP | A-9-188120 | | 7/1997 |
| JP | A-10-086622 | | 4/1998 |
| JP | A-10-310042 | | 11/1998 |
| JP | A-11-048735 | | 2/1999 |
| JP | A-2000-71737 | | 3/2000 |
| JP | B2-3132190 | | 2/2001 |
| JP | A 2003-324212 | | 11/2003 |
| JP | A-2004-74842 | | 3/2004 |
| JP | A-2005-067229 | | 3/2005 |
| JP | A-2005-145155 | | 6/2005 |
| JP | A-2005-238971 | | 9/2005 |
| JP | A-2005-329794 | | 12/2005 |

OTHER PUBLICATIONS

Oct. 29, 2008 Japanese Office Action issued in Japanese Application No. 2004-200339.

Jan. 17, 2011 Office Action issued in German Patent Application No. 11 2007 002 800.9-21 (with translation).

* cited by examiner

LATERAL ACCELERATION Gy OF VEHICLE

FIG.6

SPIN STATE AMOUNT SS

FIG.7

DRIFT-OUT STATE AMOUNT DS

FIG. 8

ROLL STIFFNESS CONTROL APPARATUS OF VEHICLE

INCORPORATION BY REFERENCE

The disclosure of Japanese Patent Application No. 2004-200339 filed on Jul. 7, 2004, including the specification, drawings and abstract is incorporated herein by reference in its entirety.

BACKGROUND OF THE INVENTION

1. Field of the Invention

The invention relates to a roll stiffness control apparatus of a vehicle. More particularly, the invention relates to a roll stiffness control apparatus of a vehicle, which controls a roll stiffness distribution ratio between front wheels and rear wheels based on a remaining capacity of the front wheels to generate a lateral force and a remaining capacity of the rear wheels to generate a lateral force such that the roll stiffness distribution ratio between the front wheels and the rear wheels is changed to an appropriate value.

2. Description of the Related Art

Japanese Patent Application Publication No. JP(A) 06-211018 discloses a known roll stiffness control apparatus of a vehicle, for example, an automobile. This roll stiffness control apparatus calculates a target yaw rate of a vehicle, and controls a roll stiffness distribution ratio between front wheels and rear wheels such that an actual yaw rate of the vehicle comes closer to the target yaw rate.

With such a roll stiffness control apparatus, the roll stiffness distribution ratio between the front wheels and the rear wheels is controlled such that the actual yaw rate of the vehicle comes closer to the target yaw rate. It is, therefore, possible to improve running stability of the vehicle during cornering without affecting acceleration/deceleration of the vehicle, unlike a case where braking forces/driving forces of the wheels are individually controlled so that the actual yaw rate of the vehicle comes closer to the target yaw rate.

Generally, when the roll stiffness distribution ratio between the front wheels and the rear wheels is controlled, a vertical load ratio between a right wheel and a left wheel changes on each of a front wheel side and a rear wheel side. Accordingly, a longitudinal force and a lateral force which can be generated by each wheel also change, and a turning limit of the vehicle also changes. However, in the above-mentioned conventional type of roll stiffness control apparatus, a force which can be generated by each wheel is not taken into account. Therefore, there is room for improvement in control of the roll stiffness distribution ratio between the front wheels and the rear wheels, which is performed so as to improve the turning limit of the vehicle.

SUMMARY OF THE INVENTION

The invention has been made in order to address the above-mentioned problem in the conventional type of roll stiffness control apparatus. It is a main object of the invention to improve a turning limit of a vehicle by estimating a remaining capacity of front wheels to generate a lateral force and a remaining capacity of rear wheels to generate a lateral force, and controlling a roll stiffness distribution ratio between the front wheels and the rear wheels based on the remaining capacity of the front wheels to generate the lateral force and the remaining capacity of the rear wheels to generate the lateral force.

According to an aspect of the invention, there is provided a roll stiffness control apparatus of a vehicle, including a controller which estimates a remaining capacity of front wheels to generate a lateral force and a remaining capacity of rear wheels to generate a lateral force, and which sets a roll stiffness distribution ratio between the front wheels and the rear wheels so as to reduce a difference between the remaining capacity of the front wheels to generate the lateral force and the remaining capacity of the rear wheels to generate the lateral force.

According to another aspect of the invention, there is provided a roll stiffness control apparatus of a vehicle, including roll stiffness distribution ratio changing means for changing a roll stiffness distribution ratio between front wheels and rear wheels; remaining capacity estimating means for estimating a remaining capacity of the front wheels to generate a lateral force and a remaining capacity of the rear wheels to generate a lateral force; and control means for controlling the roll stiffness distribution ratio changing means so as to reduce a difference between the remaining capacity of the front wheels to generate the lateral force and the remaining capacity of the rear wheels to generate the lateral force.

With the roll stiffness control apparatus having the above-mentioned structure, the roll stiffness distribution ratio between the front wheels and the rear wheels is controlled such that the difference between the remaining capacity of the front wheels to generate a lateral force and the remaining capacity of the rear wheels to generate a lateral force is reduced. Therefore, the remaining capacity of one of the front wheels and the rear wheels, which have the lower remaining capacity, can be increased, and the remaining capacity of the other of the front wheels and the rear wheels, which have the higher remaining capacity, can be decreased. Accordingly, as compared with the case where the difference between the remaining capacity of the front wheels to generate a lateral force and the remaining capacity of the rear wheels to generate a lateral force is not reduced, the lateral force of the entire vehicle can be increased, and the turning limit of the vehicle can be improved.

BRIEF DESCRIPTION OF THE DRAWINGS

The above-mentioned and other features, advantages, technical and industrial significance of this invention will be better understood by reading the following detailed description of the exemplary embodiments of the invention, when considered in connection with the accompanying drawings, in which.

DETAILED DESCRIPTION OF THE EXEMPLARY EMBODIMENTS

In the following description and the accompanying drawings, the present invention will be described in more detail with reference to an exemplary embodiment.

Figure 1:
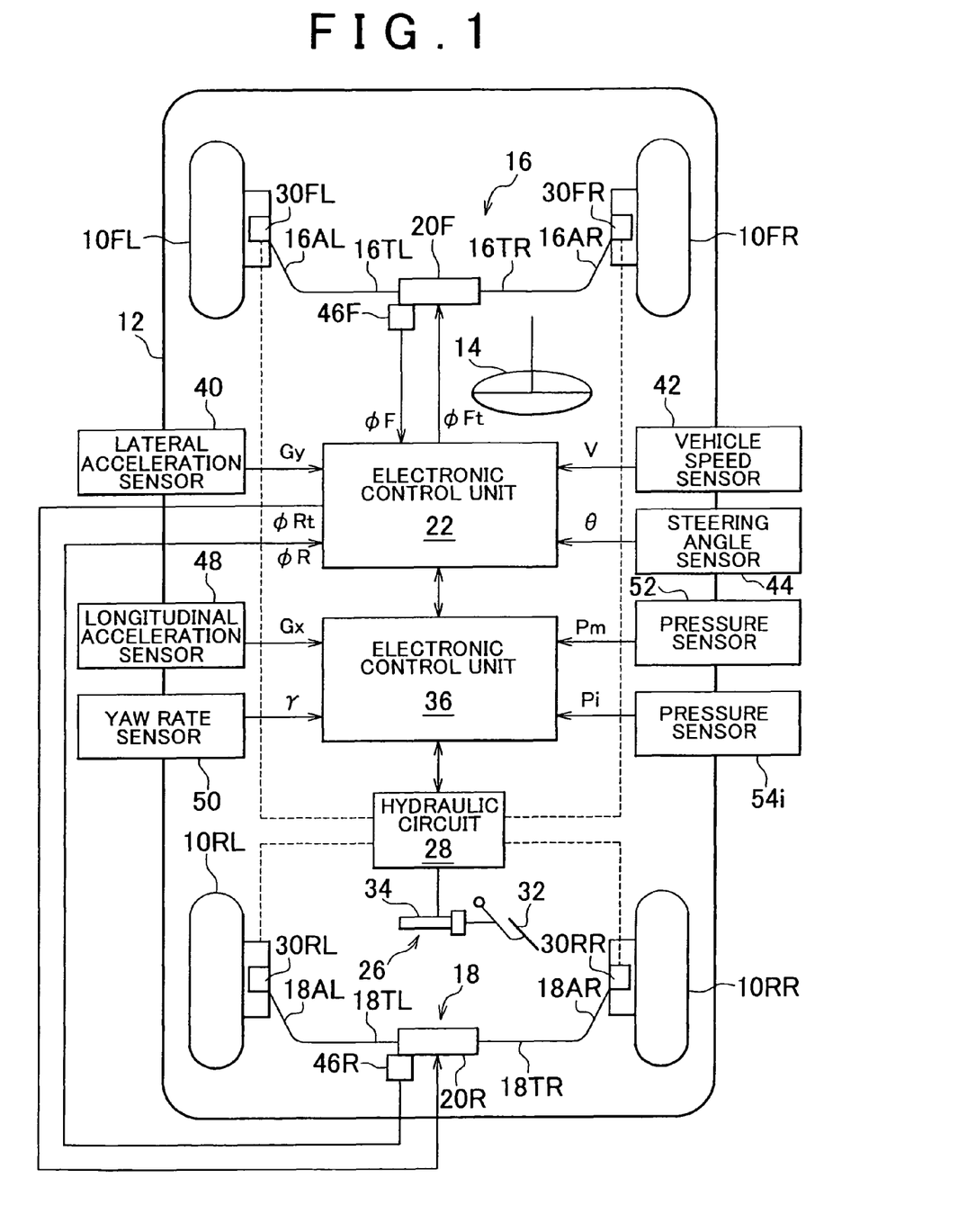
FIG. 1 is a view schematically showing a structure of a roll stiffness control apparatus of a vehicle according to an embodiment of the invention, which is applied to a vehicle provided with an active stabilizer unit on each of a front wheel side and a rear wheel side.

FIG. 1 is a view schematically showing a structure of a roll stiffness control apparatus of a vehicle according to an embodiment of the invention, which is applied to a vehicle provided with an active stabilizer unit on each of a front wheel side and a rear wheel side.

In FIG. 1, a reference numeral "10FR" indicates a right front wheel of a vehicle 12, a reference numeral "10FL" indicates a left front wheel of the vehicle 12, a reference numeral "10RR" indicates a right rear wheel of the vehicle 12, and a reference numeral "10RL" indicates a left rear wheel of the vehicle 12. The right and left front wheels 10FR and 10FL that serve as steering wheels are driven, via a tie rod, by a power steering device (not shown) that is driven when a driver turns a driver's wheel 14. The roll stiffness control apparatus according to the invention may be applied to any one of a front wheel drive vehicle, a rear wheel drive vehicle, and a four wheel drive vehicle.

An active stabilizer unit 16 is provided between the right front wheel 10FR and the left front wheel 10FL. An active stabilizer unit 18 is provided between the right rear wheel 10RR and the left rear wheel 10RL. Each of the active stabilizer units 16 and 18 applies an anti-roll moment to the vehicle (vehicle body), and increases/decreases the anti-roll moment when required.

The active stabilizer unit 16 has paired torsion bar portions 16TR and 16TL, and paired arm portions 16AR and 16AL. The torsion bar portions 16TR and 16TL are coaxially arranged along an axis extending in the lateral direction of the vehicle. The arm portion 16AR is connected integrally to an outer end of the torsion bar portion 16TR. The arm portion 16AL is connected integrally to an outer end of the torsion bar portion 16TL. Each of the torsion bar portions 16TR and 16TL is supported by a vehicle body (not shown) through a bracket (not shown) so as to be rotatable on its axis. The arm portion 16AR extends in the longitudinal direction of the vehicle while being tilted such that an inner end of the arm portion 16AR meets the outer end of the torsion bar portion 16TR. Similarly, the arm portion 16AL extends in the longitudinal direction of the vehicle while being tilted such that an inner end of the arm portion 16AL meets the outer end of the torsion bar portion 16TL. An outer end of the arm portion 16AR is connected to a wheel supporting member or a suspension arm of the right front wheel 10FR through a rubber bush device (not shown). Similarly, an outer end of the arm portion 16AL is connected to a wheel supporting member or a suspension arm of the left front wheel 10FL through a rubber bush device (not shown).

The active stabilizer unit 16 has an actuator 20F at a position between the torsion bar portions 16TR and 16TL. The actuator 20F rotates the torsion bar portions 16TR and 16TL in directions opposite to each other when required, thereby changing a force to suppress a bound and a rebound of the wheel by using a torsional stress, when the right front wheel 10FR and left front wheel 10FL bound/rebound in opposite phases. The active stabilizer unit 16 thus increases/decreases the anti-roll moment applied to the vehicle at the positions of the right and left front wheels, thereby controlling the roll stiffness of the vehicle on the front wheel side so as to change it to an appropriate value.

Similarly, the active stabilizer unit 18 has paired torsion bar portions 18TR and 18TL, and paired arm portions 18AR and 18AL. The torsion bar portions 18TR and 18TL are coaxially arranged along an axis extending in the lateral direction of the vehicle. The arm portion 18AR is connected integrally to an outer end of the torsion bar portion 18TR. The arm portion 18AL is connected integrally to an outer end of the torsion bar portion 18TL. Each of the torsion bar portions 18TR and 18TL is supported by the vehicle body (not shown) through a bracket (not shown) so as to be rotatable on its axis. The arm portion 18AR extends in the longitudinal direction of the vehicle while being tilted such that an inner end of the arm portion 18AR meets the outer end of the torsion bar portion 18TR. Similarly, the arm portion 18AL extends in the longitudinal direction of the vehicle while being tilted such that an inner end of the arm portion 18AL meets the outer end of the torsion bar portion 18TL. An outer end of the arm portion 18AR is connected to a wheel supporting member or a suspension arm of the right rear wheel 10RR through a rubber bush device (not shown). Similarly, an outer end of the arm portion 18AL is connected to a wheel supporting member or a suspension arm of the left rear wheel 10RL through a rubber bush device (not shown).

The active stabilizer unit 18 has an actuator 20R at a position between the torsion bar portions 18TR and 18TL. The actuator 20R rotates the torsion bar portions 18TR and 18TL in directions opposite to each other when required, thereby changing a force to suppress a bound and a rebound of the wheel by using a torsional stress when the right and left rear wheels 10RR and 10RL bound/rebound in opposite phases. The active stabilizer unit 18 thus increases/decreases the anti-roll moment applied to the vehicle at the positions of the right and left rear wheels 10RR and 10RL, thereby controlling the roll stiffness of the vehicle on the rear wheel side so as to change it to an appropriate value.

A structure itself of each of the active stabilizer units 16 and 18 is not a main feature of the invention. Therefore, an active stabilizer unit having a structure known in the technical field related to the invention may be arbitrarily used, as long as the active stabilizer unit can control the roll stiffness of the vehicle so as to change it to an appropriate value. For example, an active stabilizer unit disclosed in the specification and the drawing of Japanese Patent Application No. 2003-324212 filed by the applicant of the present invention may be preferably used. Namely, an active stabilizer unit may be preferably used which includes an electric motor that is fixed to an inner end of one of torsion bar portions and that has a rotating shaft with a driving gear attached thereto, and a driven gear that is fixed to an inner end of the other torsion bar portion and that is meshed with the driving gear, wherein rotation of the driving gear is transmitted to the driven gear, but rotation of the driven gear is not transmitted to the driving gear.

The actuator 20F of the active stabilizer unit 16 and the actuator 20R of the active stabilizer unit 18 are controlled by an electronic control unit 22. Although not shown in detail in FIG. 1, each of the electronic control unit 22 and an electronic control unit 36 may be formed from a microcomputer including a CPU, ROM, RAM, and an input/output port device that are connected to each other by a bi-directional common bus, and a drive circuit. The electronic control unit 22 and the electronic control unit 36 exchange information when required.

The braking forces of the wheels 10FR, 10FL, 10RR, and 10RL are controlled, when pressures Pi (i=fr, fl, rr, rl) in wheel cylinders 30FR, 30FL, 30RR, and 30RL, namely, braking pressures are controlled by a hydraulic circuit 28 of a braking device 26, respectively. Although not shown in FIG. 1, the hydraulic circuit 28 includes an oil reservoir, an oil pump, and various types of valve devices. The braking pressures of the wheel cylinders are usually controlled by a master cylinder 34 that is driven in response to an operation of a brake pedal 32 performed by the driver. When required, the braking pressures of the wheel cylinders are individually controlled by the electronic control unit 36, as described later in detail.

As shown in FIG. 1, the electronic control unit 22 receives a signal indicating lateral acceleration Gy of the vehicle, which is detected by a lateral acceleration sensor 40, a signal indicating a vehicle speed V detected by a vehicle speed sensor 42, a signal indicating a steering angle θ detected by a steering angle sensor 44, a signal indicating an actual rotation angle φF of the actuator 20F detected by a rotation angle sensor 46F, and a signal indicating an actual rotation angle φR of the actuator 20R detected by a rotation angle sensor 46R.

Meanwhile, the electronic control unit 36 receives a signal indicating longitudinal acceleration Gx of the vehicle, which is detected by a longitudinal acceleration sensor 48, a signal indicating a yaw rate γ of the vehicle, which is detected by a yaw rate sensor 50, a signal indicating a master cylinder pressure Pm, which is detected by a pressure sensor 52, and signals indicating braking pressures Pi of the wheels, which are detected by pressure sensors 54FR, 54FL, 54RR, and 54RL.

The lateral acceleration sensor 40, the steering angle sensor 44, the rotation angle sensors 46F and 46R, and the yaw rate sensor 50 detect the lateral acceleration Gy, the steering angle θ, the rotation angles φF and φR, and the yaw rate γ, respectively, by using values obtained when the vehicle is turning leftward as positive values.

Figure 2:
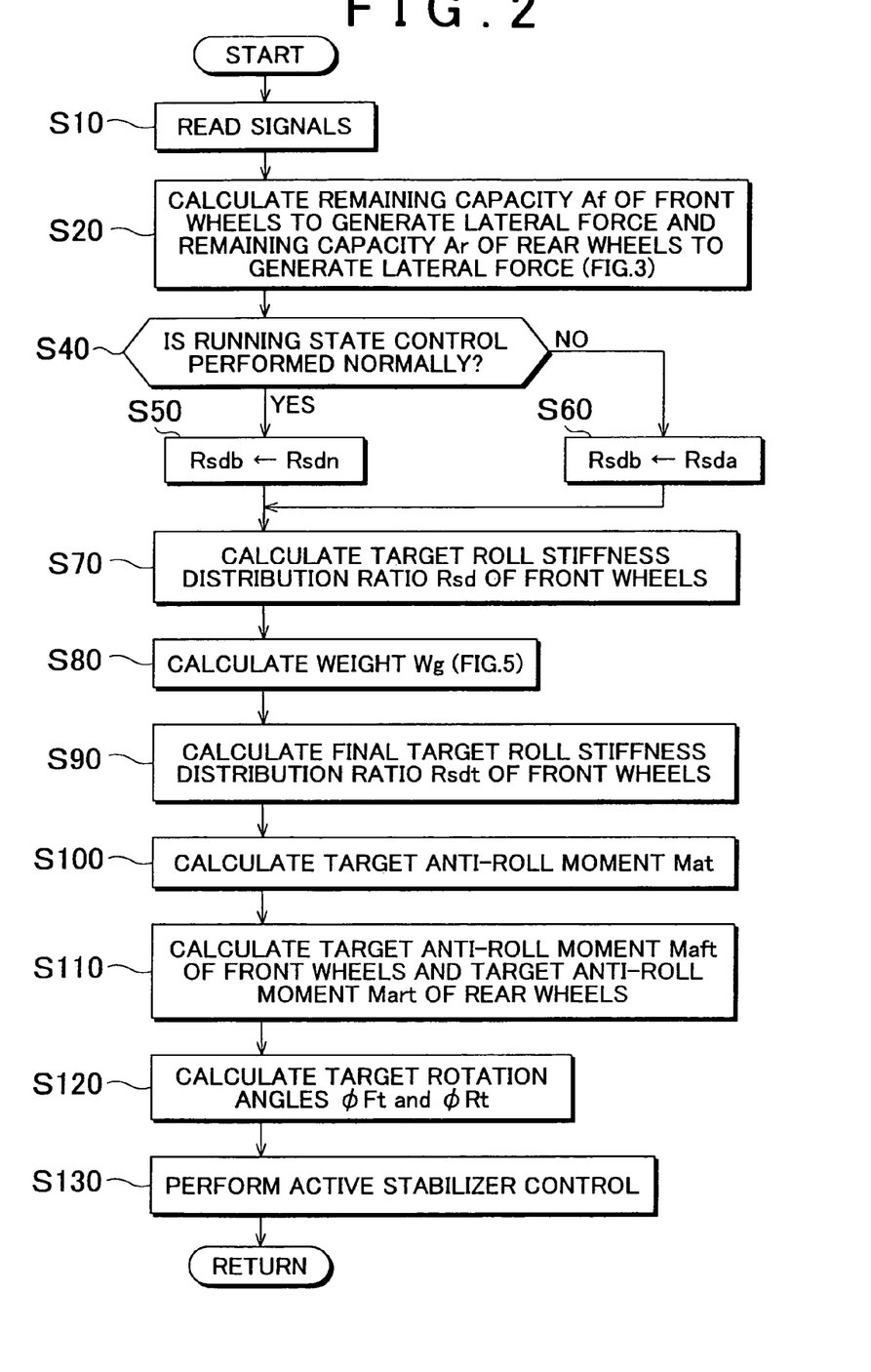
FIG. 2 is a flowchart showing a routine for controlling a roll stiffness distribution ratio between front wheels and rear wheels, and an anti-roll moment in the embodiment.
Figure 3:
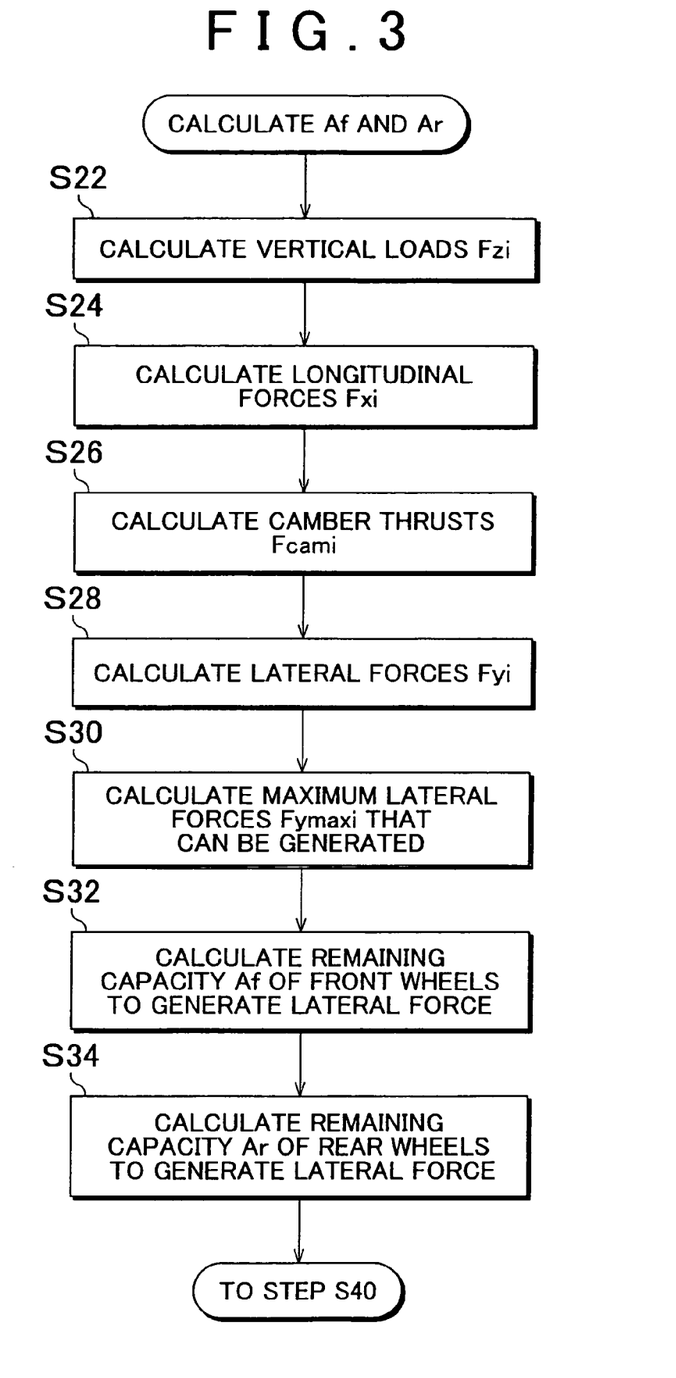
FIG. 3 is a flowchart showing a routine for calculating a remaining capacity Af of the front wheels to generate a lateral force and a remaining capacity Ar of the rear wheels to generate a lateral force in the embodiment.

The electronic control unit 22 calculates a remaining capacity Af of the front wheels to generate a lateral force, and a remaining capacity Ar of the rear wheels to generate a lateral force according to flowcharts shown in FIGS. 2 and 3. The electronic control unit 22 then calculates a value Rsd for the front wheels in the target roll stiffness distribution ratio between the front wheels and the rear wheels (for example, if the target roll stiffness distribution ratio between the front wheels and the rear wheels is 0.6:0.4, the value Rsd is 0.6) (hereinafter, referred to as a "target roll stiffness distribution ratio Rsd of the front wheels) for reducing the difference between the remaining capacity Af and the remaining capacity Ar until the remaining capacity Af and the remaining capacity Ar become equal to each other.

The electronic control unit 22 estimates a roll moment applied to the vehicle based on at least the lateral acceleration Gy of the vehicle. When the roll moment is equal to or larger than a reference value, the electronic control unit 22 calculates a target anti-roll moment Mat of the vehicle so that an anti-roll moment for canceling the roll moment increases.

The electronic control unit 22 calculates a target anti-roll moment Matf of the front wheels and a target anti-roll moment Matr of the rear wheels based on the target anti-roll moment Mat and the target roll stiffness distribution ratio Rsd of the front wheels. The electronic control unit 22 then calculates a target rotation angle φFt of the actuator 20F of the active stabilizer unit 16 based on the target anti-roll moment Matf, and a target rotation angle φRt of the actuator 20R of the active stabilizer unit 18 based on the target anti-roll moment Matr. The electronic control unit 22 performs control such that the rotation angle φF of the actuator 20F becomes the target rotation angle φFt, and the rotation angle φR of the actuator 20R becomes the target rotation angle φRt. Thus, the electronic control unit 22 reduces a roll of the vehicle that occurs, for example, during turning of the vehicle at an appropriate roll stiffness distribution ratio between the front wheels and the rear wheels.

Thus, each of the active stabilizer units 16 and 18, the electronic control unit 26, the lateral acceleration sensor 40, and the like serves as a roll stiffness changing device which increases/decreases an anti-roll moment, thereby increasing/decreasing roll stiffness of the vehicle when an excessive roll moment is applied to the vehicle.

Meanwhile, the electronic control unit 36 estimates a slip angle β of the vehicle based on a vehicle state amount which changes as the vehicle runs, for example, based on the lateral acceleration Gy of the vehicle. The electronic control unit 36 then calculates a spin state amount SS that indicates a degree of a spin of the vehicle based on a difference between a target slip angle βt of the vehicle and the slip angle β of the vehicle. The electronic control unit 36 also calculates a drift-out state amount DS that indicates a degree of drift-out of the vehicle based on a yaw rate γ difference Δγ.

The electronic control unit 36 then calculates target braking pressures Pti (i=fr, fl, rr, rl) of the wheels, at which the running state of the vehicle during turning is stabilized and a yaw movement of the vehicle becomes a target yaw movement, based on the spin state amount SS and the drift-out state amount DS. The electronic control unit 36 also controls the braking pressures Pi of the wheels to the corresponding target braking pressures Pti. Thus, the electronic control unit 36 applies a yaw moment for suppressing a spin or for suppressing drift-out to the vehicle and decelerates the vehicle, thereby performing the running state control of the vehicle for stabilizing the running state of the vehicle during turning.

Note that the running state control itself of the vehicle, which is performed by controlling the braking force is not a main feature of the invention. Therefore, the control may be arbitrarily performed in a manner known in the technical field related to the invention, as long as the yaw movement of the vehicle is controlled to the target yaw movement.

Next, control of the roll stiffness distribution ratio between the front wheels and the rear wheels and control of the anti-roll moment according to the embodiment will be described with reference to the flowchart shown in FIG. 2. The control according to the flowchart shown in FIG. 2 is started when an ignition switch (not shown) is turned ON, and is repeatedly performed at predetermined intervals until the ignition switch is turned OFF.

First, in step S10, a signal indicating the vehicle speed V detected by the vehicle speed sensor 38, and the like are read. In step S20, as described later, the remaining capacity Af of the front wheels to generate a lateral force and the remaining capacity Ar of the rear wheels to generate a lateral force are calculated according to the flowchart shown in FIG. 3.

Figure 4:
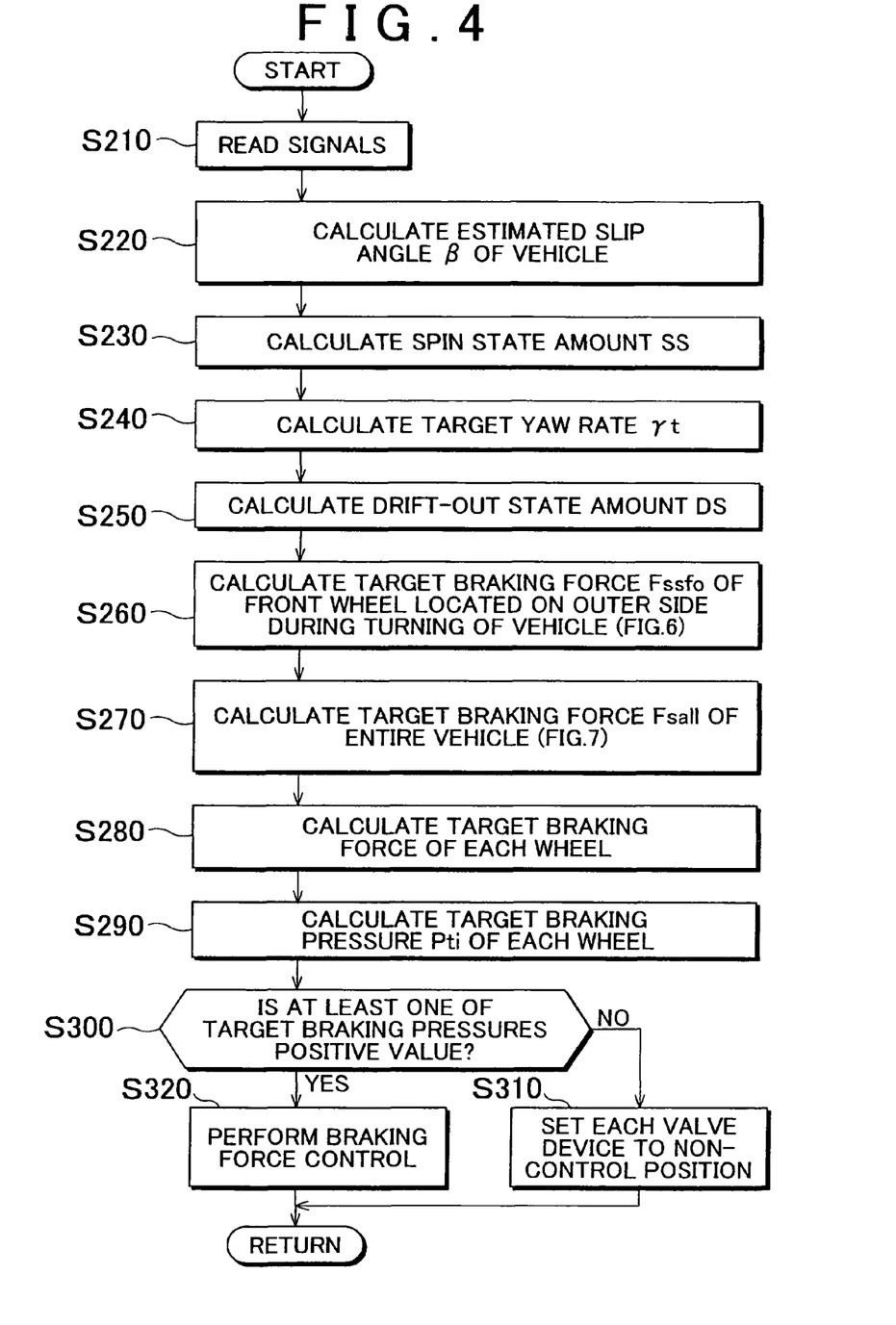
FIG. 4 is a flowchart showing a running state control routine in the embodiment.

In step S40, it is determined whether the running state control of the vehicle, which is performed according to a flowchart shown in FIG. 4, is performed normally. When an affirmative determination is made in step S40, step S50 is then performed, in which a basic roll stiffness distribution ratio Rsdb of the front wheels is set to a value Rsdn that is used when the running state control is performed normally. On the other hand, when a negative determination is made in step S40, step S60 is then performed, in which the basic roll stiffness distribution ratio Rsdb of the front wheels is set to a value Rsda that is used when the running state control is performed abnormally. The value Rsdn that is used when the running state control is performed normally is, for example, approximately 0.5. The value Rsda that is used when the running state control is performed abnormally is, for example, approximately 0.6 which is larger than the value Rsdn that is used when the running state control is performed normally.

In step S70, the target roll stiffness distribution ratio Rsd of the front wheels is calculated using the following equation 1, based on the remaining capacity Af of the front wheels to generate a lateral force and the remaining capacity Ar of the rear wheels to generate a lateral force by using a constant negative coefficient Kf.

$$Rsd = Rsdb + Kf \times (Af - Ar)/(Af + Ar) \qquad \text{Equation 1}$$

Figure 5:
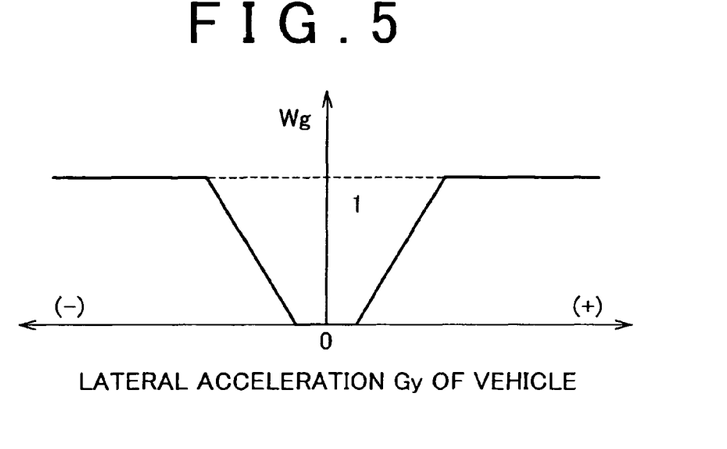
FIG. 5 is a graph showing a relationship between lateral acceleration Gy of the vehicle and a weight Wg of the vehicle.

In step S80, a weight Wg that is a value equal to or larger than 0 and is equal to or smaller than 1 is calculated by using a map corresponding to a graph shown in FIG. 5, based on the lateral acceleration Gy of the vehicle. In step S90, a final target roll stiffness distribution ratio Rsdt of the front wheels is calculated using the following equation 2, by using a target roll stiffness distribution ratio of the front wheels, which is used when the lateral acceleration Gy of the vehicle is low, as Rsds (for example, a value of approximately 0.6).

$$Rsdt = Rsds \times (1 - Wg) + Rsd \times Wg \qquad \text{Equation 2}$$

In step S800, the target anti-roll moment Mat is calculated based on, for example, the lateral acceleration Gy of the vehicle such that the target anti-roll moment Mat increases as the lateral acceleration Gy of the vehicle increases. In step S110, the target anti-roll moment Maft of the front wheels is calculated using the following equation 3, and the target anti-roll moment Mart of the rear wheels is calculated using the following equation 4.

$$Maft = Rsdt \times Mat \qquad \text{Equation 3}$$

$$Mart = (1 - Rsdt) \times Mat \qquad \text{Equation 4}$$

In step S120, the target rotation angle φFt of the actuator 20F of the active stabilizer unit 16 is calculated based on the target anti-roll moment Maft of the front wheels, and the target rotation angle φRt of the actuator 20R of the active stabilizer unit 18 is calculated based on the target anti-roll moment Mart of the rear wheels. In step S120, the rotation angle φF of the actuator 20F is controlled to the target rotation angle φFt, and the rotation angle φR of the actuator 20R is controlled to the target rotation angle φRt.

Next, a routine for calculating the remaining capacity Af of the front wheels to generate a lateral force and the remaining capacity Ar of the rear wheels to generate a lateral force according to the embodiment will be described with reference to the flowchart shown in FIG. 3.

In step S22, vertical loads Fzi (i=fr, fl, rr, rl) of the wheels are calculated in a manner known in the technical field related to the invention, based on vertical loads Fzoi (i=fr, fl, rr, rl) of the wheels that are obtained when the vehicle is standstill, the longitudinal acceleration Gx of the vehicle, and the lateral acceleration Gy of the vehicle. In step S24, longitudinal forces Fxi (i=fr, fl, rr, rl) of the wheels are calculated in a manner known in the technical field related to the invention, based on information provided by an engine control device (not shown in FIG. 1) and an automatic transmission control device (not shown in FIG. 1), and the braking pressures Pi of the wheels.

In step S26, camber thrust coefficients Kcami (i=fr, fl, rr, rl) of the wheels are calculated using the following equation 5, by using camber thrust load dependence coefficients Ki (i=fr, fl, rr, rl) of the wheels. Also, camber thrusts Fcami (i=fr, fl, rr, rl) of the wheels are calculated using the following equation 6, by using a camber angle Acam of a road surface which is estimated in a manner known in the technical field related to the invention.

$$Kcami = Fzi \times Ki \qquad \text{Equation 5}$$

$$Fcami = Acam \times Kcami \qquad \text{Equation 6}$$

In step S28, lateral forces Fyi (i=fr, fl, rr, rl) of the wheels are calculated using the following equation 7, by using a friction coefficient t of the road surface, which is estimated or detected in a manner known in the technical field related to the invention.

$$Fyi = (\mu^2 Fzi^2 - Fxi^2)^{1/2} \qquad \text{Equation 7}$$

In Step S30, maximum lateral forces Fymaxi (i=fr, fl, rr, rl) which can be generated by the wheels are calculated using the following equations 8.

$$Fymaxfr = Fyfr - Fcamfr$$

$$Fymaxfl = Fyfl + Fcamfl$$

$$Fymaxrr = Fyrr - Fcamrr$$

$$Fymaxrl = Fyrl + Fcamrl \qquad \text{Equations 8}$$

In step S32, the remaining capacity Af of the front wheels to generate a lateral force is calculated using the following equation 9.

$$Af = 1 - (|Fyfl| + |Fyfr|)/(|Fymaxfl| + |Fymaxfr|) \qquad \text{Equation 9}$$

Similarly, in step S34, the remaining capacity Ar of the rear wheels to generated a lateral force is calculated using the following equation 10.

$$Ar = 1 - (|Fyrl| + |Fyrr|)/(|Fymaxrl| + |Fymaxrr|) \qquad \text{Equation 10}$$

Next, a behavior control routine according to the embodiment will be described with reference to the flowchart shown in FIG. 4.

In step S210, a signal indicating the vehicle speed V, and the like are read. In step S220, a difference of the lateral acceleration, that is, side slip acceleration Vyd of the vehicle is calculated using the following equation 11, as a difference (Gy−V×Yr) between the lateral acceleration Gy and the product V×Yr of the vehicle speed V and the yaw rate Yr (=γ). A side slip speed Vy of the vehicle is calculated by integrating the lateral slip accelerations Vyd. Further, an estimated slip angle β of the vehicle is calculated using the following equation 12, as a ratio of the side slip speed Vy of the vehicle to a longitudinal speed Vx (=vehicle speed V) of the vehicle (Vy/Vx).

$$Vyd = Gy - V \times y \qquad \text{Equation 11}$$

$$\beta = Vy/Vx \qquad \text{Equation 12}$$

In step S230, a spin amount SV is calculated using the following equation 13, as a linear sum of the estimated slip angle β of the vehicle and a derivative value βd (K1×β+K2×βd), K1 and K2 being positive constants. In addition, the direction in which the vehicle turns is detected based on, for example, a code of the yaw rate γ. The spin state amount SS is calculated as a positive value SV when the vehicle is turning leftward. The spin state amount SS is calculated as a negative value −SV when the vehicle is turning rightward. When the result of calculation shows a negative value, the spin state amount is 0.

$$SV = K1 \times \beta + K2 \times \beta d \qquad \text{Equation 13}$$

The spin amount SV is a value obtained based on the difference between the target slip angle $\beta t$ of the vehicle and the estimated slip angle $\beta$ of the vehicle (the target slip angle $\beta t$ of the vehicle is 0) and a rate of change in the difference. The spin amount SV may be calculated using the following equation 14, as a linear sum of the slip angle $\beta$ of the vehicle and the side slip acceleration Vyd of the vehicle.

$$SV = K1 \times \beta + K2 \times Vyd \qquad \text{Equation 14}$$

In step S240, a reference yaw rate $\gamma e$ is calculated using the following equation 15 based on the vehicle speed V and the steering angle $\theta$, by using a wheel base H, a stability factor Kh, and a steering gear ratio Rg. In addition, a target yaw rate $\gamma t$ of the vehicle is calculated using the following equation 16, by using a time constant T, and a Laplace operator s. The reference yaw rate $\gamma e$ may be calculated by taking the side slip acceleration Gy of the vehicle into consideration in order to take a dynamic yaw rate into account.

$$\gamma e = V \times (\theta/Rg) / \{(1 + KhV2) \times H\} \qquad \text{Equation 15}$$

$$\gamma t = \gamma e / (1 + Ts) \qquad \text{Equation 16}$$

In step S250, a drift value DV is calculated using the following equation 17, based on the difference between the target yaw rate $\gamma t$ and the yaw rate $\gamma$. In addition, the direction in which the vehicle turns is detected based on, for example, the code of the yaw rate $\gamma$. The drift-out state amount DS is calculated as a positive value DV when the vehicle is turning leftward, and as a negative value −DV when the vehicle is turning right ward. When the result of calculation shows a negative value, the drift-out state amount is 0. The drift value DV may be calculated using the following equation 18.

$$DV = (\gamma t - \gamma) \qquad \text{Equation 17}$$

$$DV = H \times (\gamma t - \gamma) / V \qquad \text{Equation 18}$$

Figure 6:
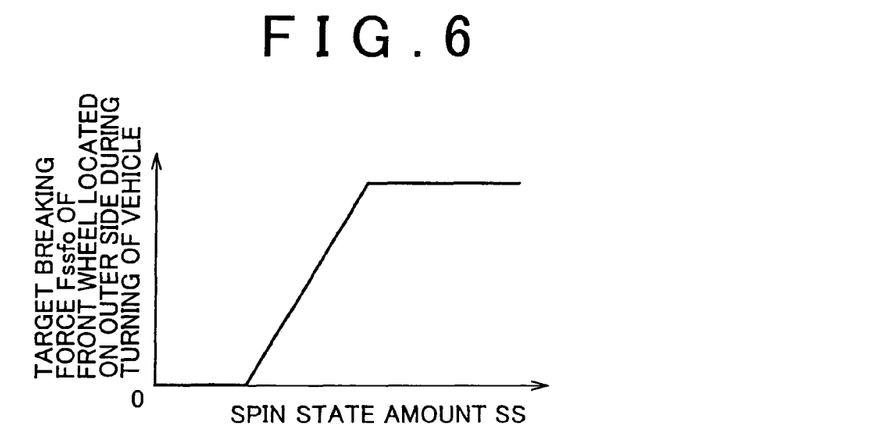
FIG. 6 is a graph showing a relationship between a spin state amount SS and a target braking force Fssfo of a front wheel located on an outer side during turning of the vehicle.
Figure 7:
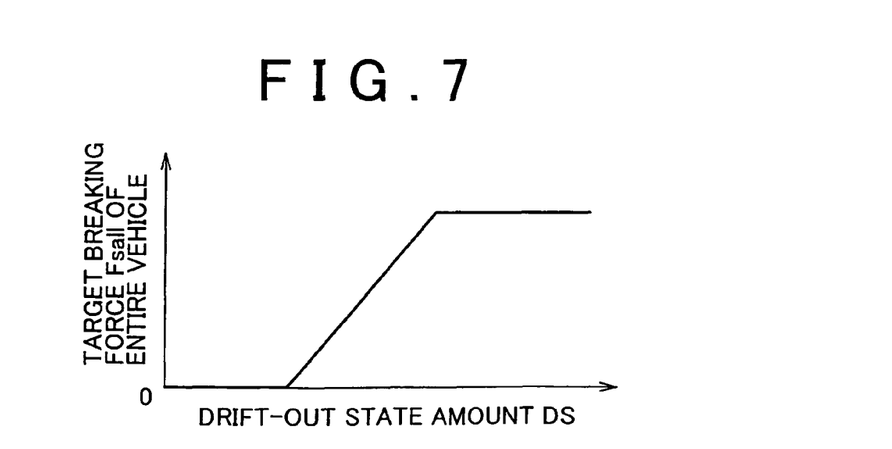
FIG. 7 is a graph showing a relationship between a drift-out state amount DS and a target braking force Fsall of the entire vehicle.

In step S260, a target braking force Fssfo of the front wheel located on the outer side when the vehicle is turning is calculated using a map corresponding to a graph shown in FIG. 6 based on the spin state amount SS. In step S270, a target braking force Fsall of the entire vehicle is calculated using a map corresponding to a graph shown in FIG. 7 based on the drift-out state amount DS.

In step S280, a target braking force Fsfo of the front wheel located on the outer side during turning of the vehicle, a target braking force Fsfi of the front wheel located on the inner side during turning of the vehicle, a target braking force Fsro of the rear wheel located on the outer side during turning of the vehicle, and a target braking force Fsri of the rear wheel located on the inner side during turning of the vehicle are calculated using the following equations 19, by using a distribution ratio Ksri for the rear wheel located on the inner side during turning of the vehicle (generally, Ksri is a positive constant larger than 0.5).

$$Fsfo = Fssfo$$

$$Fsfi = 0$$

$$Fsro = (Fsall - Fssfo) \times (1 \times Ksri)$$

$$Fsri = (Fsall - Fssfo) \times Ksri \qquad \text{Equations 19}$$

In step S290, the wheels are located on the outer side during turning of the vehicle and the wheels are located on the inner side during turning of the vehicle are determined by detecting the direction in which the vehicle turns based on, for example, the code of the yaw rate $\gamma$, and the target braking pressures Pti (i=fr, fl, rr, rl) of the wheels are calculated by using a conversion coefficient Kb for converting the braking force into the braking pressure, based on the detection result. Namely, the target braking pressures Pti (i=fr, fl, rr, rl) of the wheels, which are obtained when the vehicle is turning leftward, are calculated by following equations 20. Also, the target braking pressures Pti (i=fr, fl, rr, rl) of the wheels, which are obtained when the vehicle is turning rightward, are calculated by following equations 21.

$$Ptfr = Fsfo \times Kb$$

$$Ptfl = Fsfi \times Kb$$

$$Ptrr = Fsro \times Kb$$

$$Ptrl = Fsri \times Kb \qquad \text{Equations 20}$$

$$Ptfr = Fsfi \times Kb$$

$$Ptfl = Fsfo \times Kb$$

$$Ptrr = Fsri \times Kb$$

$$Ptrl = Fsro \times Kb \qquad \text{Equations 21}$$

In step S300, it is determined whether at least one of the target braking pressures Pti is a positive value, namely, whether the control of the braking force needs to be performed by the stabilization control of the vehicle. When an affirmative determination is made in step S300, step S320 is then performed. On the other hand, when a negative determination is made in step S300, step S310 is then performed in which each of the valve devices and the like is set to a non-control position. Then, the routine is reset and step S210 is performed again without performing control of the braking force by the stabilization control.

In step S320, the braking device 26 is controlled such that the braking pressures Pi of the wheels become the target braking pressures Pti calculated in step S290, whereby control of the braking force is performed by the vehicle state control, after which the routine is reset and step S210 is performed again.

As described above, in step S20, the remaining capacity Af of the front wheels to generate a lateral force and the remaining capacity Ar of the rear wheels to generate a lateral force are calculated. In step S70, the target roll stiffness distribution ratio Rsd of the front wheels, for reducing the difference between the remaining capacity Af and the remaining capacity Ar until the remaining capacity Af and the remaining capacity Ar become equal to each other is calculated based on the remaining capacity Af of the front wheels and the remaining capacity Ar of the rear wheels. In steps S80 and S90, the final target roll stiffness distribution ratio Rsdt of the front wheels is calculated. In step S100, the target anti-roll moment Mat is calculated based on the lateral acceleration Gy of the vehicle. In step S110, the target anti-roll moment Maft of the front wheels and the target anti-roll moment Mart of the rear wheels for achieving the target anti-roll moment Mat at the final target roll stiffness distribution ratio Rsdt are calculated. In step S120 and S130, the active stabilizer units 16 and 18 are controlled such that the target anti-roll moments Maft and Mart are achieved.

Therefore, the anti-roll moment of the entire vehicle is controlled to the target anti-roll moment Mat, whereby a roll of the vehicle can be effectively reduced. In addition, the roll stiffness distribution ratio between the front wheels and the rear wheels is controlled to a roll stiffness distribution ratio between the front wheels and the rear wheels corresponding to the final target roll stiffness distribution ratio Rsdt, whereby the difference between the remaining capacity Af of the front wheels to generate a lateral force and the remaining capacity Ar of the rear wheels to generate a lateral force is reduced. Accordingly, as compared with the case where difference between the remaining capacity Af of the front wheels to generate a lateral force and the remaining capacity Ar of the rear wheels to generate a lateral force is not reduced, the lateral force of the entire vehicle can be increased, and therefore the turning limit of the vehicle can be improved.

According to the embodiment shown in the drawings, the steer characteristics of the vehicle during turning can be automatically changed to appropriate steer characteristics. Generally, the roll stiffness distribution ratio between the front wheels and the rear wheels is set such that the value for the front wheels is larger than the value for the rear wheels, in order to obtain appropriate turning stability. Therefore, when the vehicle starts turning, first, a turning lateral force is generated in the front wheels and the remaining capacity Af of the front wheels to generate a lateral force is reduced. In order to deal with the reduction in the remaining capacity Af, the roll stiffness distribution ratio between the front wheels and the rear wheels is changed such that the value for the rear wheels becomes larger than the value for the front wheels, the steer characteristics of the vehicle are changed to the steer characteristics on the over-steer side, and it becomes easy for the vehicle to make a turn. After this, when the remaining capacity Ar of the rear wheels to generate a lateral force is reduced, the roll stiffness distribution ratio is changed such that the value for the front wheels becomes larger than the value for the rear wheels in order to deal with the reduction in the remaining capacity Ar, the steer characteristics of the vehicle are changed to the steer characteristics on the under-steer side, and the appropriate turning stability of the vehicle is obtained.

According to the embodiment shown in the drawings, when it is determined in step S40 that the running state control of the vehicle is performed normally, step S50 is then performed in which the basic roll stiffness distribution ratio Rsdb of the front wheels is set to the value Rsdn that is used when the running state control is performed normally. On the other hand, when it is determined in step S40 that the running state control of the vehicle is performed abnormally, step S60 is then performed in which the basic roll stiffness distribution ratio Rsdb is set to the value Rsda that is used when the running state control is performed abnormally. In step S70, the target roll stiffness distribution ratio Rsd of the front wheels is calculated using the equation 1 based on the remaining capacity Af of the front wheels to generate a lateral force and the remaining capacity Ar of the rear wheels to generate a lateral force.

Accordingly, when the running state control of the vehicle is performed abnormally, the difference between the remaining capacity Af and the remaining capacity Ar can be reduced while the roll stiffness distribution ratio between the front wheels and the rear wheels is set such that the value for the front wheels is larger than the value for the rear wheels, as compared to the case where the running state control of the vehicle is performed normally. Thus, when the running state control of the vehicle is performed abnormally, the steer characteristics of the vehicle are changed to the steer characteristics on the under-steer side, whereby the turning stability of the vehicle can be reliably improved.

According to the embodiment shown in the drawings, in step S80, the weight Wg that is a value equal to or larger than 0 and is equal to or smaller than 1 is calculated based on the lateral acceleration Gy of the vehicle such that the weight Wg becomes a small value in a region in which the lateral acceleration Gy of the vehicle is low. In step S90, the final target roll stiffness distribution ratio Rsdt of the front wheels is calculated using the equation 2. Therefore, the control of the roll stiffness distribution ratio between the front wheels and the rear wheels is prevented from being performed unnecessarily in a state where the lateral acceleration Gy of the vehicle is low, and the effect of increasing/decreasing the lateral forces of the front and rear wheels is low, the effect being obtained by controlling the roll stiffness distribution ratio between the front wheels and the rear wheels. Accordingly, the frequency of performing the control of the roll stiffness distribution ratio between the front wheels and the rear wheels, and the energy consumption due to performing the control can be reduced. Especially, deterioration of the steering feel due to a reduction of the roll stiffness of the front wheels can be suppressed.

While the invention has been described in detail with reference to the exemplary embodiment, it will be apparent to those skilled in the art that the invention is not limited to the above-mentioned embodiment, and that the invention may be realized in various other embodiments within the scope of the invention.

For example, in the above-mentioned embodiment, the remaining capacity Af of the front wheels to generate a lateral force is calculated using the equation 9, and the remaining capacity Ar of the rear wheels to generate a lateral force are calculated using the equation 10. However, each of the remaining capacity Af of the front wheels to generate a lateral force and the remaining capacity Ar of the rear wheels to generate a lateral force may be calculated as the absolute value of each of the differences (Fymaxi−Fyi) between the maximum lateral forces Fymaxi which can be generated by the wheels and the corresponding lateral forces Fyi of the wheels such that each of the remaining capacity Af and the remaining capacity Ar indicates the amount of the lateral force which can be further generated by each wheel.

The remaining capacity Af of the front wheels to generate a lateral force may be calculated as a lateral force load factor, which is a ratio of the lateral force to the force that can be further generated by each wheel, using the following equation 22, such that the remaining capacity Af indirectly indicates the remaining capacity of each wheel to generate a lateral force. Similarly, the remaining capacity Ar of the rear wheels to generate a lateral force may be calculated as a lateral force load factor, which is a ratio of the lateral force to the force that can be further generated by each wheel, using the following equation 23, such that the remaining capacity Ar indirectly indicates the remaining capacity of each wheel to generate a lateral force. In this case, calculation of the target roll stiffness distribution ratio Rsd of the front wheels in step S70 is performed using the following equation 24.

$$Af=(|Fyfl|+|Fyfr|)/(|Fymaxfl|+|Fymaxfr|) \quad \text{Equation 22}$$

$$Ar=(|Fyrl|+|Fyrr|)/(|Fymaxrl|+|Fymaxrr|) \quad \text{Equation 23}$$

$$Rsd=Rsdb+Kf(Ar-Af)/(Af+Ar) \quad \text{Equation 24}$$

In the above-mentioned embodiment, the weight Wg is calculated in step S80 using the map corresponding to the graph shown in FIG. 5, based on the lateral acceleration Gy of the vehicle. The weight Wg may be set so as to be changed based on the vehicle speed V such that the weight Wg becomes smaller as the vehicle speed V decreases; the weight Wg may be set so as to be changed based on the friction factor μ of the road surface such that the weight Wg becomes larger as the friction factor μ of the road surface decreases; or the weight Wg may be set so as to be changed based on a power supply voltage Ve, which drives the actuator 20F of the active stabilizer unit 16 and the actuator 20R of the active stabilizer unit 18, such that the weight Wg becomes smaller as the power supply voltage Ve decreases.

In the above-mentioned embodiment, the vehicle includes a running state control device, and the spin control and the drift-out control are performed such that the yaw movement of the vehicle becomes the target yaw movement. However, the roll stiffness control apparatus according to the invention may be applied to a vehicle in which only one of the spin control and the drift-out control is performed. Also, the roll stiffness control apparatus according to the invention may be applied to a vehicle that is not provided with a running state control device. In the above-mentioned embodiment, the running state control of the vehicle is performed by controlling the braking force of each wheel. However, the running state control may be achieved by controlling the braking force of each wheel.

Figure 8:
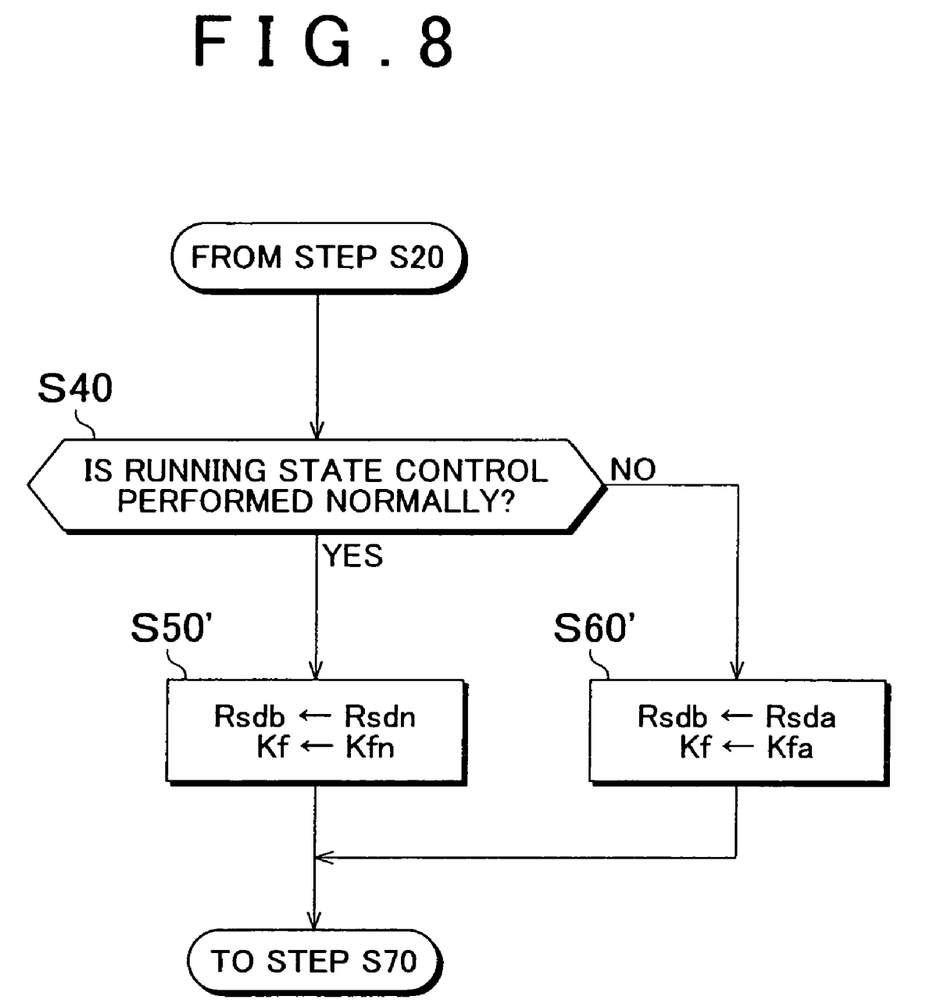
FIG. 8 is a flowchart showing a main part of a routine for controlling the roll stiffness distribution ratio between the front wheels and the rear wheels, and the anti-roll moment in a modified example.

In the above-mentioned embodiment, the basic roll stiffness distribution ratio Rsdb of the front wheels is changed based on whether the running state control is performed abnormally. However, the basic roll stiffness distribution ratio Rsdb of the front wheels may be changed according to a modified routine, for example, as shown in FIG. 8. In the routine shown in FIG. 8, when it is determined in step S40 that the running state control is performed normally, step S50' is then performed in which the basic roll stiffness distribution ratio Rsdb of the front wheels is set to the value Rsdn that is used when the running state control is performed normally, and the coefficient Kf is set to a value Kfn (negative constant) that is used when the running state control is performed normally. On the other hand, when it is determined in step S40 that the running state control of the vehicle is performed abnormally, step S60' is then performed in which the basic roll stiffness distribution ratio Rsdb of the front wheels is set to the value Rsda that is used when the running state control is performed abnormally, and the coefficient Kf is set to a value Kfa (negative constant smaller than Kfn) that is used when the running state control is performed abnormally.

In the above-mentioned embodiment, the weight Wg is calculated in step S80 as a value equal to or larger than 0 and equal to or smaller than 1 based on the lateral acceleration Gy of the vehicle. However, the weight Wg may be calculated based on the estimated roll moment of the vehicle or the target anti-roll moment Mat.

In the above-mentioned embodiment, the anti-roll moment is increased/decreased by the active stabilizer units, whereby the roll of the vehicle is reduced and the roll stiffness distribution ratio between the front wheels and the rear wheels is controlled to an appropriate value. However, means for increasing/decreasing the anti-roll moment may be any types of means known in the technical field related to the invention, for example, an active suspension, as long as the means can increase/decrease the vertical loads of the wheels.

In the above-mentioned embodiment, the target anti-roll moment Mat of the vehicle is calculated based on the lateral acceleration Gy of the vehicle. However, the target anti-roll moment Mat may be calculated based on the estimated lateral acceleration Gyh of the vehicle that is calculated based on the vehicle speed V and the steering angle θ. Also, the target anti-roll moment Mat may be calculated based on, for example, the linear sum of the lateral acceleration Gy of the vehicle and the estimated lateral acceleration Gyh of the vehicle.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are examplary, other combinations and configurations, including more, less or only a single element, are also within the spirit and scope of the invention.

What is claimed is:

1. A roll stiffness control apparatus of a vehicle, comprising:

a controller which estimates a remaining capacity of front wheels to generate a lateral force and a remaining capacity of rear wheels to generate a lateral force, and which sets a roll stiffness distribution ratio between the front wheels and the rear wheels so as to reduce a difference between the remaining capacity of the front wheels to generate the lateral force and the remaining capacity of the rear wheels to generate the lateral force, wherein the remaining capacity of the front wheels to generate a lateral force is a difference between a maximum lateral force of the front wheels and an actual lateral force currently generated by the front wheels, and the remaining capacity of the rear wheels to generate a lateral force is a difference between a maximum possible lateral force of the rear wheels and an actual lateral force currently generated by the rear wheels, wherein the remaining capacity of the front wheels to generate the lateral force and the remaining capacity of the rear wheels to generate the lateral force is based at least on a vertical load applied to each of the respective front or rear wheel, the vehicle includes a yaw movement control device which controls a braking force and a driving force of each wheel to make a yaw movement of the vehicle come closer to a target yaw movement, the controller calculates a target roll stiffness distribution ratio of the front wheels as a sum of a basic roll stiffness distribution ratio and a roll stiffness distribution ratio increasing or decreasing amount of the front wheels, the roll stiffness distribution ratio increasing or decreasing amount being used to reduce the difference between the remaining capacity of the front wheels to generate the lateral force and the remaining capacity of the rear wheels to generate the lateral force, the controller controls reducing the roll stiffness distribution ratio of one wheel from among the front wheels and the rear wheels and increasing the roll stiffness distribution ratio of the other wheels from among the front wheels and the rear wheels, the remaining capacity of the one wheel to generate the lateral force being larger than the remaining capacity of the other wheels to generate the lateral force, the controller calculates the target roll stiffness distribution ratio of the rear wheels based on the target roll stiffness distribution ratio of the front wheels, the controller controls the roll stiffness distribution ratio between the front wheels and the rear wheels such that the roll stiffness distribution ratio of the front wheels and the rear wheels become the target roll stiffness distribution ratio of the front wheels and the rear wheels, and the controller changes the basic roll stiffness distribution ratio such that the basic roll stiffness distribution ratio of the front wheels to the rear wheels is set higher when the yaw movement control device operates abnormally as compared to when the yaw movement control device operates normally.

2. The roll stiffness control apparatus of the vehicle according to claim 1, wherein
when the yaw movement control device operates abnormally, the controller reduces the roll stiffness distribution ratio increasing or decreasing amount as compared to when the yaw movement control device operates normally.

3. The roll stiffness control apparatus of the vehicle according to claim 1, wherein
the yaw movement control device stabilizes a running state of the vehicle by calculating a spin state amount indicating a degree of a spin of the vehicle, and supplying the vehicle with a yaw moment for suppressing the spin based on the spin state amount and decelerating the vehicle.

4. The roll stiffness control apparatus of the vehicle according to claim 1, wherein
the yaw movement control device stabilizes a running state of the vehicle by calculating a drift-out state amount indicating a degree of drift-out of the vehicle, and supplying the vehicle with a yaw moment for suppressing the drift-out based on the drift-out state amount and decelerates the vehicle.

5. The roll stiffness control apparatus of the vehicle according to claim 1, wherein
when the roll movement of the vehicle is small the controller estimates a roll moment of the vehicle, and makes a degree of reduction in the difference lower than a degree of reduction in the difference, when the roll moment of the vehicle is large.

6. The roll stiffness control apparatus of the vehicle according to claim 5, wherein
the controller detects lateral acceleration of the vehicle, and estimates a roll moment of the vehicle based on the detected lateral acceleration of the vehicle.

7. The roll stiffness control apparatus of the vehicle according to claim 5, wherein
the controller estimates lateral acceleration of the vehicle based on a vehicle speed and a steering angle, and estimates a roll moment of the vehicle based on the estimated lateral acceleration of the vehicle.

8. The roll stiffness control apparatus of the vehicle according to claim 5, wherein
the controller detects lateral acceleration of the vehicle and estimates lateral acceleration of the vehicle based on a vehicle speed and a steering angle, and determines a degree of a roll of the vehicle based on the detected lateral acceleration of the vehicle and the estimated lateral acceleration of the vehicle.

9. The roll stiffness control apparatus of the vehicle according to claim 1, wherein
the controller changes roll stiffness at a position of the front wheels by changing an anti-roll moment at the position of the front wheels, and changes roll stiffness at a position of the rear wheels by changing an anti-roll moment at a position of the rear wheels.

10. The roll stiffness control apparatus of the vehicle according to claim 9, wherein
the controller estimates a roll moment of the vehicle;
the controller calculates a target anti-roll moment of the vehicle based on the roll moment of the vehicle; and
the controller changes the roll stiffness at the position of the front wheels and the roll stiffness at the position of the rear wheels such that the roll stiffness distribution ratio of the front wheels approaches the target roll stiffness distribution ratio of the front wheels, and such that the anti-roll moment of the vehicle approaches the target anti-roll moment.

11. The roll stiffness control apparatus of the vehicle according to claim 10, wherein
the controller detects lateral acceleration of the vehicle, and estimates a roll moment of the vehicle based on the detected lateral acceleration of the vehicle.

12. The roll stiffness control apparatus of the vehicle according to claim 10, wherein
the controller estimates lateral acceleration of the vehicle based on a vehicle speed and a steering angle, and estimates a roll moment of the vehicle based on the estimated lateral acceleration of the vehicle.

13. The roll stiffness control apparatus of the vehicle according to claim 10, wherein
the controller detects lateral acceleration of the vehicle and estimates lateral acceleration of the vehicle based on a vehicle speed and a steering angle, and determines a degree of a roll of the vehicle based on the detected lateral acceleration of the vehicle and the estimated lateral acceleration of the vehicle.

14. The roll stiffness control apparatus of the vehicle according to claim 9, wherein
the controller includes an active stabilizer having a stabilizer which is divided into two portions, and an actuator which rotates torsion bars of the stabilizer with respect to each other; and
the controller increases or decreases the anti-roll moment by increases or decreases a rotation angle of the actuator, thereby increasing or decreasing the roll stiffness.

15. The roll stiffness control apparatus of the vehicle according to claim 9, wherein
the controller increases or decreases support stiffness of a suspension by increasing or decreasing a spring constant of a suspension spring, thereby increasing or decreasing the roll stiffness.

16. The roll stiffness control apparatus of the vehicle according to claim 1, wherein
the remaining capacity of the front wheels to generate the lateral force is calculated as a ratio of (1) the maximum lateral force of the front wheels minus an actual lateral force generated by the front wheels to (2) the maximum lateral force of the front wheels, and the remaining capacity of the rear wheels to generate the lateral force is calculated as a ratio of (1) the maximum lateral force of the rear wheels minus an actual lateral force generated by the rear wheels to (2) the maximum lateral force of the rear wheels.

17. The roll stiffness control apparatus of the vehicle according to claim 1, wherein
the remaining capacity of the front wheels to generate the lateral force is calculated as a ratio of (1) a sum of maximum lateral forces of the right and left front wheels minus a sum of actual lateral forces currently being generated by the left and right wheels to (2) the sum of the maximum lateral forces of the right and left front wheels, and the remaining capacity of the rear wheels to generate the lateral force is calculated as a ratio of (1) a sum of maximum lateral forces of the right and left rear wheels minus a sum of actual lateral forces currently being generated by the right and left rear wheels to (2) the sum of the maximum lateral forces of the right and left rear wheels.

18. The roll stiffness control apparatus of the vehicle according to claim 1, wherein
the remaining capacity of the front wheels to generate the lateral force is calculated as a difference between a (1) the maximum lateral force of the front wheels and (2) an actual lateral force currently generated by the front wheels and the remaining capacity of the rear wheels to generate the lateral force is calculated as a difference between (1) the maximum lateral force of the rear wheels and (2) an actual lateral force currently generated by the rear wheels.

19. The roll stiffness control apparatus of the vehicle according to claim 1, wherein
the remaining capacity of the front wheels to generate the lateral force is calculated as a difference between (1) a sum of maximum lateral forces of the right and left front wheels and (2) a sum of actual lateral forces currently generated by the right and left front wheels and the remaining capacity of the rear wheels to generate the lateral force is calculated as a difference between (1) a sum of maximum lateral forces of the right and left rear wheels and (2) a sum of actual lateral forces of the right and left rear wheels.

20. The roll stiffness control apparatus of the vehicle according to claim 1, wherein
the difference between the remaining capacity of the front wheels to generate the lateral force and the remaining capacity of the rear wheels to generate the lateral force is reduced by increasing a value in the roll stiffness distribution ratio for the wheels having the higher remaining capacity to generate the lateral force, and decreasing a value in the roll stiffness distribution ratio for the wheels having the lower remaining capacity to generate the lateral force.

21. A roll stiffness control apparatus of a vehicle, comprising:
roll stiffness distribution ratio changing means for changing a roll stiffness distribution ratio between front wheels and rear wheels;
remaining capacity estimating means for estimating a remaining capacity of the front wheels to generate a lateral force and a remaining capacity of the rear wheels to generate a lateral force; and
control means for controlling the roll stiffness distribution ratio changing means so as to reduce a difference between the remaining capacity of the front wheels to generate the lateral force and the remaining capacity of the rear wheels to generate the lateral force, wherein
the remaining capacity of the front wheels to generate a lateral force is a difference between a maximum lateral force of the front wheels and an actual lateral force currently generated by the front wheels, and the remaining capacity of the rear wheels to generate a lateral force is a difference between a maximum possible lateral force of the rear wheels and an actual lateral force currently generated by the rear wheels, wherein
the remaining capacity of the front wheels to generate the lateral force and the remaining capacity of the rear wheels to generate the lateral force is based at least on a vertical load applied to each of the respective front or rear wheels,
the vehicle includes a yaw movement control means which controls a braking force and a driving force of each wheel to make a yaw movement of the vehicle come closer to a target yaw movement,
the control means calculates a target roll stiffness distribution ratio of the front wheels as a sum of a basic roll stiffness distribution ratio and a roll stiffness distribution ratio increasing or decreasing amount of the front wheels, the roll stiffness distribution ratio increasing or decreasing amount being used to reduce the difference between the remaining capacity of the front wheels to generate the lateral force and the remaining capacity of the rear wheels to generate the lateral force,
the control means controls reducing the roll stiffness distribution ratio of one wheel from among the front wheels and the rear wheels and increasing the roll stiffness distribution ratio of the other wheels from among the front wheels and the rear wheels, the remaining capacity of the one wheel to generate the lateral force being larger than the remaining capacity of the other wheels to generate the lateral force,
the control means calculates the target roll stiffness distribution ratio of the rear wheels based on the target roll stiffness distribution ratio of the front wheels,
the control means controls the roll stiffness distribution ratio between the front wheels and the rear wheels such that the roll stiffness distribution ratio of the front wheels and the rear wheels become the target roll stiffness distribution ratio of the front wheels and the rear wheels, and
the control means changes the basic roll stiffness distribution ratio such that the basic roll stiffness distribution ratio of the front wheels to the rear wheels is set higher when the yaw movement control device operates abnormally as compared to when the yaw movement control device operates normally.

* * * * *